(12) United States Patent
Takahashi et al.

(10) Patent No.: US 8,749,946 B2
(45) Date of Patent: *Jun. 10, 2014

(54) VACUUM CAPACITOR

(75) Inventors: Eiichi Takahashi, Shizuoka (JP);
Toshimasa Fukai, Shizuoka (JP);
Toshinori Tatsumi, Shizuoka (JP);
Yuichi Nishikiori, Shizuoka (JP); Kaoru Kitakizaki, Saitama (JP); Toru Tanimizu, Ibaraki (JP)

(73) Assignee: Meidensha Corporation, Tokyo (JP)

( * ) Notice: Subject to any disclaimer, the term of this patent is extended or adjusted under 35 U.S.C. 154(b) by 432 days.

This patent is subject to a terminal disclaimer.

(21) Appl. No.: 13/131,468

(22) PCT Filed: Nov. 19, 2009

(86) PCT No.: PCT/JP2009/069625
§ 371 (c)(1),
(2), (4) Date: May 26, 2011

(87) PCT Pub. No.: WO2010/064544
PCT Pub. Date: Jun. 10, 2010

(65) Prior Publication Data
US 2011/0228441 A1    Sep. 22, 2011

(30) Foreign Application Priority Data

Dec. 2, 2008  (JP) .................................. 2008-307993
Dec. 2, 2008  (JP) .................................. 2008-307994

(51) Int. Cl.
*H01G 5/00*      (2006.01)
(52) U.S. Cl.
USPC ........... 361/279; 361/278; 361/287; 361/292; 361/298.1
(58) Field of Classification Search
USPC ...................... 361/277, 278, 292, 287, 298.1
See application file for complete search history.

(56) References Cited

U.S. PATENT DOCUMENTS 2,740,077 A * 3/1956 Knox et al. .................... 361/279
4,007,406 A * 2/1977 Weisbrod ...................... 361/279
(Continued)

FOREIGN PATENT DOCUMENTS

EP    1 193 726 A2    4/2002
EP      1193726 A2    4/2002
(Continued)

OTHER PUBLICATIONS

U.S. Appl. No. 13/131,486, filed May 26, 2011, Eiichi Takahashi et al.

(Continued)

*Primary Examiner* — Robert J Hoffberg
*Assistant Examiner* — Hung Dang
(74) *Attorney, Agent, or Firm* — Foley & Lardner LLP

(57)             ABSTRACT

A vacuum capacitor includes a fixed electrode, a movable electrode, a movable electrode shaft, a magnetic flux receiving unit, a magnetic flux generating unit and a capacitance control unit. A plurality of electrode members in a vacuum casing form the fixed electrode. The fixed electrode is divided into a plurality of fixed electrodes, and each fixed electrode is lead outside the vacuum casing and electrically connected to each other in series. A plurality of electrode members arranged in gaps between the electrode members of the fixed electrode form the movable electrode. Rotating the movable electrode shaft, which supports the movable electrode, varies capacitance between the movable electrode and the fixed electrode. The magnetic flux receiving unit rotates the movable electrode shaft. The magnetic flux generating unit, located outside the vacuum casing, rotates the magnetic flux receiving unit by magnetic attraction. The capacitance control unit rotates the magnetic flux generating unit.

17 Claims, 5 Drawing Sheets

(56) References Cited

U.S. PATENT DOCUMENTS

| | | | | |
|---|---|---|---|---|
| 4,035,697 | A | * | 7/1977 | Arnold, Jr. .................... 361/289 |
| 4,068,285 | A | * | 1/1978 | Yamada et al. ............... 361/293 |
| 4,177,495 | A | * | 12/1979 | Perret ........................... 361/279 |
| 4,953,057 | A | * | 8/1990 | Davidian ...................... 361/279 |
| 5,376,862 | A | * | 12/1994 | Stevens ...................... 310/75 D |
| 5,539,266 | A | | 7/1996 | Stevens |
| 6,268,995 | B1 | * | 7/2001 | Beuerman et al. ............ 361/277 |
| 6,473,289 | B1 | * | 10/2002 | Weisse et al. .............. 361/283.1 |
| 6,920,033 | B2 | * | 7/2005 | Jahreiss et al. ................ 361/277 |
| 6,922,327 | B2 | * | 7/2005 | Chua et al. ................... 361/278 |
| 7,042,699 | B2 | | 5/2006 | Takahashi et al. |
| 2002/0048136 | A1 | * | 4/2002 | Nemoto et al. ............... 361/277 |
| 2005/0264974 | A1 | * | 12/2005 | Takahashi et al. ........... 361/277 |
| 2013/0038978 | A1 | | 2/2013 | Takahashi et al. |

FOREIGN PATENT DOCUMENTS

| | | |
|---|---|---|
| JP | 51-122760 A | 10/1976 |
| JP | 52-040762 A | 3/1977 |
| JP | 58-000413 U | 1/1983 |
| JP | 6-241237 A | 8/1994 |
| JP | 8-45785 A | 2/1996 |
| JP | 8-288179 A | 11/1996 |
| JP | 11-158604 A | 6/1999 |
| JP | 2001-28321 A | 1/2001 |
| JP | 2002-208538 A | 7/2002 |
| JP | 2005-504444 A | 2/2005 |
| JP | 2005-180535 A | 7/2005 |
| JP | 2007-287468 A | 11/2007 |
| TW | 523765 | 3/2003 |

OTHER PUBLICATIONS

USPTO, U.S. Appl. No. 13/131,486, filed Sep. 16, 2013, 17 pages.
USPTO, U.S. Appl. No. 13/641,794, filed Sep. 18, 2013, 17 pages.
USPTO Notice of Allowance, U.S. Appl. No. 13/131,486, Feb. 3, 2014, 9 pages.
USPTO Notice of Allowance, U.S. Appl. No. 13/641,794, Jan. 31, 2014, 9 pages.

* cited by examiner

VACUUM CAPACITOR

TECHNICAL FIELD

The present invention relates to a vacuum capacitor applied, for example, in a high-frequency power supply circuit used in a semiconductor manufacturing system, and relates to a variable type vacuum capacitor in which a fixed electrode and a movable electrode are arranged in a vacuum casing and whose capacitance value is variable.

BACKGROUND ART

Many vacuum capacitors are applied, for example, in the high-frequency power supply circuit used in the semiconductor manufacturing system. When broadly categorizing the vacuum capacitor by its structure, there are two types of vacuum capacitors of a fixed type vacuum capacitor whose capacitance value is fixed and a variable type vacuum capacitor (e.g. Patent Documents 1~4) whose capacitance value is variable.

As an example of the variable type vacuum capacitor, a capacitor, in which a fixed electrode and a movable electrode are arranged in a vacuum casing and whose capacitance is varied by moving the movable electrode while maintaining a vacuum state in the vacuum casing using bellows etc., is known. As the vacuum casing, an insulation tube body made of insulation material such as ceramic material and seal members made of material of copper etc. are provided, and each opening end side of the insulation tube body is closed by the seal member, then the vacuum casing is formed. Each seal member is formed mainly from a tube member that is provided at the opening end side of the insulation tube body and a cover member that closes the tube member.

The fixed electrode is formed from a plurality of substantially cylindrical electrode members whose diameters are different from each other and which are arranged concentrically (for instance, the cylindrical electrode members are arranged at a certain distance). The fixed electrode is provided at one (hereinafter, called one side seal member, and the other is called the other side seal member) of the seal members inside the vacuum casing. The movable electrode is, same as the fixed electrode, formed from a plurality of substantially cylindrical electrode members whose diameters are different from each other and which are arranged concentrically (for instance, the cylindrical electrode members are arranged at a certain distance). The movable electrode is arranged inside the vacuum casing so that each electrode member of the movable electrode can be inserted into and extracted from a gap between the electrode members of the fixed electrode (the electrode members of the movable electrode are arranged in a staggered configuration so as to be inserted into and extracted from the gap between the electrode members of the fixed electrode and alternately overlap the electrode member of the fixed electrode) with the each electrode member of the movable electrode in noncontact with the electrode members of the fixed electrode. This movable electrode is supported by a movable electrode shaft that moves in an axial direction of the vacuum casing (that moves so as to be able to adjust the extent of the insertion/extraction of the movable electrode with respect to the fixed electrode).

The movable electrode shaft is formed, for instance, from a supporting member (hereinafter, called a movable supporting member) to support the movable electrode and a rod (hereinafter, called a movable rod) that extends from a back surface side of the movable supporting member (e.g. from a surface side of the movable supporting member which faces the other side seal member) to the axial direction of the vacuum casing. This movable electrode shaft is slidably supported (for instance, the movable electrode shaft is slidably supported so that the movable rod can slide in the axial direction of the vacuum casing), for instance, through a bearing member provided at the vacuum casing (e.g. a bearing member fixed at the middle of the cover member).

To adjust the capacitance by moving the movable electrode shaft in the axial direction of the vacuum casing, for example, a member (hereinafter, called a capacitance control unit) that is connected to one end side of the movable rod and rotates by a drive source such as a motor is used. This capacitance control unit is screwed onto the one end side of the movable rod (for example, a female screw part formed at the capacitance control unit is screwed onto the male screw part formed at the one end side of the movable rod), then connects with the movable rod. The capacitance control unit that can rotate by the drive source such as the motor is employed. Further, the capacitance control unit is supported rotatably with respect to the vacuum casing etc. through a supporting member formed from e.g. a thrust bearing.

The bellows is a bellows metal member having expansion/contraction characteristics. The bellows serves as a part of a current path of the vacuum capacitor, and divides the inside of the vacuum casing into a vacuum chamber and an atmospheric chamber. By virtue of this bellows, the movable electrode, the movable supporting member and the movable rod can move in the axial direction of the vacuum casing with a space enclosed by the fixed electrode, the movable electrode and the bellows in the vacuum casing kept airtight as the vacuum chamber (with the space being a vacuum state). For example, one side edge of the bellows is connected to an inner wall side of the other side seal member at the bearing member side, and the other side edge of the bellows is connected to the movable supporting member etc.

Here, with regard to the connection of the bellows, for instance, vacuum brazing is employed. Further, as the bellows, there are some bellows having different structures. For example, bellows having a structure in which the other side edge of the bellows is connected to a surface of the movable rod and bellows having a double bellows structure (e.g. the structure in which stainless bellows and copper bellows are combined) are known.

In the vacuum capacitor having such structure described above, by rotating the capacitance control unit by the drive source such as the motor, rotational motion by the rotation of the capacitance control unit is converted to axial direction motion of the movable electrode shaft, then an overlap area between the fixed electrode and the movable electrode is varied in response to a movement amount of the movable electrode shaft. At this time, the bellows expands or contracts in accordance with the movement of the movable rod.

With this, when voltage is applied to the fixed electrode and the movable electrode and the bellows expands or contracts, the overlap area between the fixed electrode and the movable electrode changes, and a value of capacitance appearing between the both electrodes is seamlessly changed, then the impedance adjustment is made. Regarding high frequency current for the high-frequency apparatus of a case using such vacuum capacitor, the high frequency current flows from the one side seal member to the other side seal member through the bellows and the capacitance between the facing electrodes (between the fixed electrode and the movable electrode).

CITATION LIST

Patent Document

Patent Document 1: Japanese Patent Application Publication No. JP6-241237

Patent Document 2: Japanese Patent Application Publication No. JP2005-180535

Patent Document 3: Japanese Patent Application Publication No. JP8-45785

Patent Document 4: Japanese Translation of PCT International Application No. JPA_2005504444

SUMMARY OF THE INVENTION

Technical Problem

As described above, in the case where the capacitance is varied by moving the movable electrode shaft while maintaining the vacuum state of the vacuum chamber in the variable type vacuum capacitor, it can be read that the metal member having expansion/contraction properties, such as the bellows, is needed (to divide the inside of the vacuum casing into a vacuum chamber and an atmospheric chamber). Also it can be read that there is a need to move the movable electrode shaft in the axial direction of the vacuum casing by the rotational motion of the capacitance control unit.

That is to say, when moving the movable electrode shaft, it is required that the movement of the movable electrode shaft be done against a pressure occurring at a division wall (the bellows, the insulation tube body and the one side seal member, etc.) of the vacuum chamber. In addition, since a high mechanical stress is imposed on the metal member such as the bellows at every repetition of the expansion/contraction, the metal member is likely to be broken, and a life of the vacuum capacitor (the vacuum chamber etc.) also becomes shorter. Especially when the bellows serves as the current path, temperature of the bellows becomes high due to heat generation upon the application of the current. Thus the life of the vacuum capacitor becomes even shorter.

In the case where the rotational motion by the capacitance control unit is converted to the axial direction motion of the movable electrode shaft, for instance, the structure in which the capacitance control unit and the movable electrode shaft (the movable rod etc.) are connected by the screw-connection is employed. However, because a plurality of rotational motion of the capacitance control unit is required, it takes much time to adjust the capacitance, it is therefore difficult to instantaneously change the capacitance value.

Solution To Problem

In order to solve the above problems, according to one aspect of the present invention, a vacuum capacitor, in which a fixed electrode formed from a plurality of electrode members is arranged and a movable electrode formed from a plurality of electrode members is arranged in a gap formed between the electrode members of the fixed electrode in a vacuum casing, the fixed electrode being divided into a plurality of fixed electrodes and each fixed electrode being lead to an outside of the vacuum casing and electrically connected to each other in series through respective lead connection terminals, and whose capacitance appearing between the movable electrode and the fixed electrode is varied by rotating a movable electrode shaft that supports the movable electrode, the vacuum capacitor comprises: a magnetic flux receiving unit that rotates the movable electrode shaft in the vacuum casing; a magnetic flux generating unit that is located outside the vacuum casing and rotates the magnetic flux receiving unit by magnetic attraction; and a capacitance control unit that rotates the magnetic flux generating unit.

According to another aspect of the present invention, a vacuum capacitor comprises: a vacuum casing formed by closing both opening end sides of an insulation tube body by respective seal members; a fixed electrode formed by arranging a plurality of flat electrode members in layers at a certain distance in an axial direction of the vacuum casing in the vacuum casing; a movable electrode formed by arranging a plurality of flat electrode members in layers at a certain distance in the axial direction of the vacuum casing in the vacuum casing, and fixed to a movable electrode shaft that extends in the axial direction of the vacuum casing and is rotatably supported in the vacuum casing, and by rotation of the movable electrode shaft, the each electrode member of the movable electrode being inserted into and extracted from a gap between the electrode members of the fixed electrode and alternately overlapping the electrode member of the fixed electrode with the each electrode member of the movable electrode in noncontact with the electrode members of the fixed electrode; a magnetic flux receiving unit fixed to the movable electrode shaft in the vacuum casing and receiving magnetic flux from the outside of the vacuum casing through the seal member; and a capacitance control unit having a magnetic flux generating unit that generates the magnetic flux and rotatably supported outside the seal member, and the fixed electrode is divided into a plurality of fixed electrodes and each fixed electrode being lead to an outside of the vacuum casing and electrically connected to each other in series through respective lead connection terminals, and by rotating the capacitance control unit also rotating the magnetic flux receiving unit by magnetic attraction of the magnetic flux, an overlap area of the movable electrode with respect to the fixed electrode is changed, and capacitance is adjustable.

According to a further aspect of the invention, a vacuum capacitor, in which a fixed electrode formed from a plurality of electrode members is arranged and a movable electrode formed from a plurality of electrode members is arranged in a gap formed between the electrode members of the fixed electrode in a vacuum casing, the fixed electrode being divided into a plurality of fixed electrodes and each fixed electrode being lead to an outside of the vacuum casing and electrically connected to each other through respective lead connection terminals, and whose capacitance appearing between the movable electrode and the fixed electrode is varied by rotating a movable electrode shaft that supports the movable electrode, the vacuum capacitor comprises: a magnetic flux receiving unit that rotates the movable electrode shaft in the vacuum casing; a magnetic flux generating unit that is located outside the vacuum casing and rotates the magnetic flux receiving unit by magnetic attraction; and a capacitance control unit that rotates the magnetic flux generating unit, and by positioning the lead connection terminals apart from the magnetic flux generating unit, interference of generated heat and magnetic flux with the magnetic flux generating unit upon current application to the lead connection terminals is reduced.

According to a further aspect of the invention, a vacuum capacitor comprises: a vacuum casing formed by closing both opening end sides of an insulation tube body by respective seal members; a fixed electrode formed by arranging a plurality of flat electrode members in layers at a certain distance in an axial direction of the vacuum casing in the vacuum casing; a movable electrode formed by arranging a plurality of flat electrode members in layers at a certain distance in the axial direction of the vacuum casing in the vacuum casing, and fixed to a movable electrode shaft that extends in the axial direction of the vacuum casing and is rotatably supported in the vacuum casing, and by rotation of the movable electrode shaft, the each electrode member of the movable electrode being inserted into and extracted from a gap between the electrode members of the fixed electrode and alternately overlapping the electrode member of the fixed electrode with the each electrode member of the movable electrode in noncontact with the electrode members of the fixed electrode; a magnetic flux receiving unit fixed to the movable electrode shaft in the vacuum casing and receiving magnetic flux from the outside of the vacuum casing through the seal member; and a capacitance control unit having a magnetic flux generating unit that generates the magnetic flux and rotatably supported outside the seal member, and the fixed electrode is divided into a plurality of fixed electrodes in a direction of the layer arrangement of the electrode members and each fixed electrode is lead to an outside of the vacuum casing from a gap between the fixed electrodes and electrically connected to each other through respective lead connection terminals, and by positioning the lead connection terminals apart from the magnetic flux generating unit, interference of generated heat and magnetic flux with the magnetic flux generating unit upon current application to the lead connection terminals is reduced, and by rotating the capacitance control unit also rotating the magnetic flux receiving unit by magnetic attraction of the magnetic flux, an overlap area of the movable electrode with respect to the fixed electrode is changed, and capacitance is adjustable. Here, the insulation tube body could be divided into a plurality of insulation tube bodies, and at least one of the respective lead connection terminals is disposed between the divided insulation tube bodies.

Here, as an embodiment of the fixed electrode divided into a plurality of fixed electrodes, the fixed electrode may be supported by respective fixed electrode shafts.

Further, as an embodiment of the magnetic flux receiving unit and the magnetic flux generating unit, the magnetic flux receiving unit and the magnetic flux generating unit may be arranged in a same line direction orthogonal to the movable electrode shaft.

Furthermore, as an embodiment of the capacitance control unit, the capacitance control unit may have a plurality of magnetic flux generating units, and the magnetic flux generating units may be arranged at regular intervals along a circumferential direction.

Moreover, as an embodiment of the each area of the electrode members, each area of the electrode members may be smaller than an area in a cross-section direction of an inside of the vacuum casing, and by the rotation of the movable electrode shaft which is within one revolution, the capacitance may be variable within a range from a minimum capacitance value to a maximum capacitance value.

In addition, a forcing part could be provided at a portion of an inner wall of the vacuum casing which faces one end portion of the movable electrode shaft, and is a partition that covers and seals a penetration hole formed at the portion from the inside of the vacuum casing, and supports the one end portion of the movable electrode shaft while forcing the movable electrode shaft in a direction of the other end portion of the movable electrode shaft.

Further, a supporting portion could be provided at either one side of the movable electrode shaft and a vacuum casing inner wall facing the movable electrode shaft and supports the other side at one point.

Effects of the Invention

As described above, according to the present invention, there is no need to use the bellows, and it is possible to prolong the life of the vacuum capacitor. In addition, the instantaneous change of the capacitance can be achieved by the rotation of the movable electrode.

EMBODIMENTS FOR CARRYING OUT THE INVENTION

In the following description, an embodiment of a variable type vacuum capacitor according to the present invention will be explained with reference to FIGS. 1 to 8.

Figure 1:
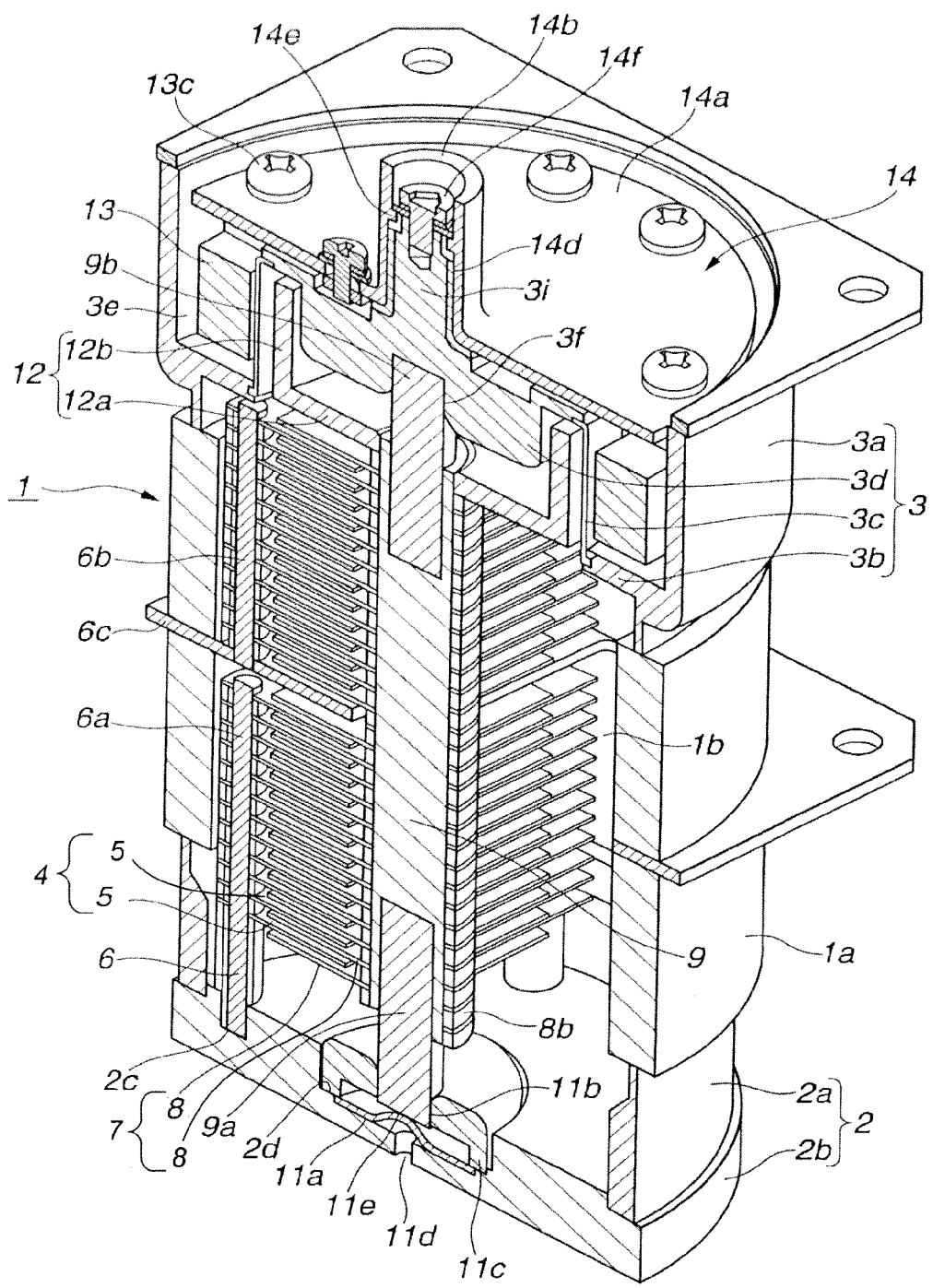
FIG. 1 is a perspective view of a longitudinal cross section of part of a vacuum capacitor, according to the present embodiment.

FIG. 1 is a perspective view of a longitudinal cross section of part of the variable type vacuum capacitor. A reference sign 1 denotes a vacuum casing. An insulation tube body 1a made of insulation material such as ceramic material and one side seal member 2 and the other side seal member 3 made of material of copper etc. are provided, and both opening end sides of the insulation tube body 1a are closed by the seal members 2 and 3, then the vacuum casing 1 is formed. The vacuum casing 1 has a vacuum chamber 1b inside the vacuum casing 1.

The one side seal member 2 in FIG. 1 has a tube member 2a that is provided at the one opening end side (in FIG. 1, at a lower side) of the insulation tube body 1a and a cover member 2b that closes the tube member 2a. Further, a groove portion 2c (three groove portions in FIG. 2) to support an after mentioned fixed electrode shaft 6 so as to stand is formed at an outer circumferential edge portion on an inner surface of the cover member 2b in the vacuum chamber 1b. A groove portion 2d to mount an after mentioned guide 11c is formed at the middle of the cover member 2b in the vacuum chamber 1b.

The other side seal member 3 in FIG. 1 has a tube member 3a that is provided at the other opening end side (in FIG. 1, at an upper side) of the insulation tube body 1a, a ring-shaped flange 3b that protrudes from an inner circumferential surface of the tube member 3a (in FIG. the flange 3b protrudes in a radial direction of the tube member 3a), a cylindrical partition wall 3c that is supported so as to stand by the flange 3b, and a cover member 3d that closes one opening end side (in FIG. 1, at an upper side) of the partition wall 3c. A ring-shaped groove portion 3e that is a movement passage for an after mentioned magnetic flux generating unit 13 is defined by a space enclosed by these tube member 3a, flange 3b and partition wall 3c. Furthermore, a groove portion 3f to rotatably support an after mentioned movable electrode shaft 9 is formed at the middle on an inner surface of the cover member 3d in the vacuum chamber 1b.

A reference sign 4 denotes a fixed electrode that is formed by arranging a plurality of flat electrode members 5 in layers at a certain distance (that is greater than a thickness of an electrode member 8 of a movable electrode 7) in an axial direction of the vacuum chamber 1b (in a direction of a line connecting the seal members 2 and 3). The fixed electrode 4 is fixedly supported through the fixed electrode shaft 6.

In FIG. 1, two split fixed electrode shafts 6a and 6b are used. One fixed electrode shaft 6a stands on the cover member 2b and is fixed to the cover member 2b, and is electrically connected to a lead connection terminal (not shown) provided at an outer side of the cover member 2b outside the vacuum chamber 1b. The other fixed electrode shaft 6b is fixedly supported by a lead connection terminal 6c that penetrates and is positioned at the middle, in a longitudinal direction, of the insulation tube body 1a. The fixed electrode shaft 6b is electrically connected to the lead connection terminal, 6c. With this, the fixed electrode 4 is divided into an electrode (hereinafter, called one side fixed electrode) positioned at the one side seal member 2 side and electrically connected to the lead connection terminal (not shown) and an electrode (hereinafter, called the other side fixed electrode) positioned at the other side seal member 3 side and electrically connected to the lead connection terminal 6c.

A reference sign 7 denotes the movable electrode that is formed by arranging a plurality of flat electrode members 8 in layers at a certain distance (that is greater than a thickness of the electrode member 5 of the fixed electrode 4) in the axial direction of the vacuum chamber 1b, same as the fixed electrode 4. The electrode members 8 are arranged in a staggered configuration inside the vacuum chamber 1b so that each electrode member 8 can be inserted into and extracted from a gap between the electrode members 5 of the fixed electrode 4 and alternately overlap the electrode member 5 with the each electrode member 8 of the movable electrode 7 in noncontact with the electrode members 5 of the fixed electrode 4. The movable electrode 7 is rotatably supported through the movable electrode shaft 9 that extends in the axial direction (e.g. in FIG. 1, on a shaft center) of the vacuum chamber 1b. The movable electrode shaft 9 in FIG. 1 is provided, at its both ends, with insulative shafts 9a and 9b. The insulative shaft 9a and the insulative shaft 9b are rotatably supported through a penetration hole 11b and the groove portion 3f respectively.

Here, the movable electrode 7 in FIG. 1 is not electrically connected to an outside of the vacuum casing 1. The movable electrode 7 is divided into an electrode (hereinafter, called one side movable electrode) positioned at the one side seal member 2 side and overlapping and inserted into and extracted from the one side fixed electrode and an electrode (hereinafter, called the other side movable electrode) positioned at the other side seal member 3 side and overlapping and inserted into and extracted from the other side fixed electrode.

That is, a capacitance C in the vacuum casing 1 is a total capacitance of capacitance (hereinafter, called one side capacitance) by an overlap area between the one side fixed electrode and the one side movable electrode and capacitance (hereinafter, called the other side capacitance) by an overlap area between the other side fixed electrode and the other side movable electrode. Therefore, configuration of the vacuum casing 1 is the one that connects two capacitors in series.

Here, in a case where the fixed electrode 4 is divided into a plurality of fixed electrodes and each fixed electrode is electrically connected to the outside of the vacuum casing 1 through the respective lead connection terminals, configuration in which, same as the divided fixed electrode 4, the movable electrode 7 and the movable electrode shaft 9 are also divided respectively into a plurality of movable electrodes and a plurality of movable electrode shafts (for instance, the movable electrode shaft 9 is divided using the insulator at a part of the movable electrode shaft 9) and a plurality of these capacitors are connected in series is conceived. Further, in a case where the insulation tube body 1a is divided into a plurality of insulation tube bodies, configuration, in which at least one of the respective lead connection terminals is disposed between the divided insulation tube bodies 1a, is conceived.

Regarding a supporting structure of the movable electrode shaft 9 at the one side seal member 2 side, as long as the structure is a structure that can maintain the vacuum state of the vacuum chamber 1b, various kinds of structures can be applied. For example, as shown in FIG. 1, it could be a structure in which the guide 11c provided with the penetration hole (having such shape that one end side of the movable electrode shaft 9 (in FIG. 1, the insulative shaft 9a) can penetrate) 11b is provided so as to cover, from the inside of the vacuum chamber 1b, an adjustment diaphragm 11a that is provided on a bottom of the groove portion 2d. Then, the one end side of the movable electrode shaft 9 penetrates the penetration hole 11b of the guide 11c, and the one end side is supported by the adjustment diaphragm 11a. In the case of this structure, force by press-deformation of the adjustment diaphragm 11a acts on the one end side of the movable electrode shaft 9 from the one end side touching the adjustment diaphragm 11a to the other end side of the movable electrode shaft 9 (in a direction of the other side seal member 3).

Furthermore, in a case where a hole 11d that communicates with the outside of the vacuum casing 1 is formed in the groove portion 2d, the adjustment diaphragm 11a is press-deformed in accordance with a difference between an atmospheric pressure of the outside of the vacuum casing 1 and a vacuum pressure of the vacuum chamber 1b. That is, the force that press-deforms the adjustment diaphragm 11a from the outside of the vacuum casing 1 to a direction of the inside of the vacuum chamber 1b acts on the adjustment diaphragm 11a by the pressure difference between the outside of the vacuum casing 1 and the vacuum chamber 1b, and the force of this press-deformation adds to the movable electrode shaft 9. The movable electrode shaft 9 is therefore supported while being pressed in the direction of the other side seal member 3.

Moreover, in a case where configuration, in which one end surface side of the movable electrode shaft 9 is flat as shown in FIG. 1 and a portion 11e of the adjustment diaphragm 11a which touches the movable electrode shaft 9 is formed into a pointed shape then a part of the one end surface of the movable electrode shaft 9 is supported at a point by the portion 11e, is employed, for instance, a contact area is small as compared with a case where an entire surface of the one end surface of the movable electrode shaft 9 is supported. As a consequence, a rotation resistance of the movable electrode shaft 9 can be reduced. In addition, also in a case where configuration, in which the portion lie touching the movable electrode shaft 9 is not formed into the pointed shape but formed into a flat shape and the end surface of the movable electrode shaft 9 is formed into a pointed shape then the end surface touches the portion 11e at this apex, is employed, the same effect can be gained. That is, as long as the configuration is the one in which either one side of the movable electrode shaft 9 and the vacuum chamber 1b inner wall that faces the movable electrode shaft 9 has a supporting portion that supports the other side at one point, the rotation resistance can be reduced.

A reference sign 12 denotes a magnetic flux receiving unit that is provided at the other side seal member 3 side of the movable electrode shaft 9 and rotates with the movable electrode shaft 9. The magnetic flux receiving unit 12 receives magnetic flux Φ of the after mentioned magnetic flux generating unit 13. For example, the magnetic flux receiving unit 12 is made of ferromagnetic material such as iron and nickel. As shown in FIG. 1, the magnetic flux receiving unit 12, having a disk member 12a that is supported by penetration of the movable electrode shaft 9 and a receiving wall 12b that stands from an outer circumferential edge portion of the disk member 12a in the axial direction of the vacuum chamber 1b, is used.

A reference sign 14 denotes a capacitance control unit that has the magnetic flux generating unit 13 and is supported rotatably with respect to an outside of the other side seal member 3. For instance, as shown in FIG. 1, the capacitance control unit 14, having a disk member 14a that is supported rotatably with respect to the cover member 3d through an annular control member side guide shaft 14b and the magnetic flux generating unit 13 that is provided at an outer circumferential edge portion on an inner surface of the disk member 14a in the vacuum chamber 1b and moves in the groove portion 3e with the rotation of the disk member 14a, is used. This magnetic flux generating unit 13 could be formed from, for instance, a permanent magnet 13a having N pole and S pole and a holder 13b holding the permanent magnet 13a. For instance, the magnetic flux generating unit 13 is fixed to the disk member 14a using connecting means 13a such as a screw.

In the vacuum capacitor shown in FIG. 1, the movable electrode shaft 9, the magnetic flux receiving unit 12 and the capacitance control unit 14 (the magnetic flux generating unit 13) rotate in the same direction. Regarding each structure in the vacuum chamber 1b, for example, the adjustment diaphragm 11a, the electrode member 5 and a spacer 5b and the fixed electrode shaft 6 which belong to the fixed electrode 4, and the electrode member 8 and a spacer 8b and the movable electrode shaft 9 which belong to the movable electrode 7, could each be secured in a variety of manners. However, it could be possible to employ a manner in which melting fixation is performed by brazing in the vacuum condition when producing the vacuum at high temperature (e.g. approx. 800° C.) upon the forming of the vacuum chamber 1b.

Figure 2:
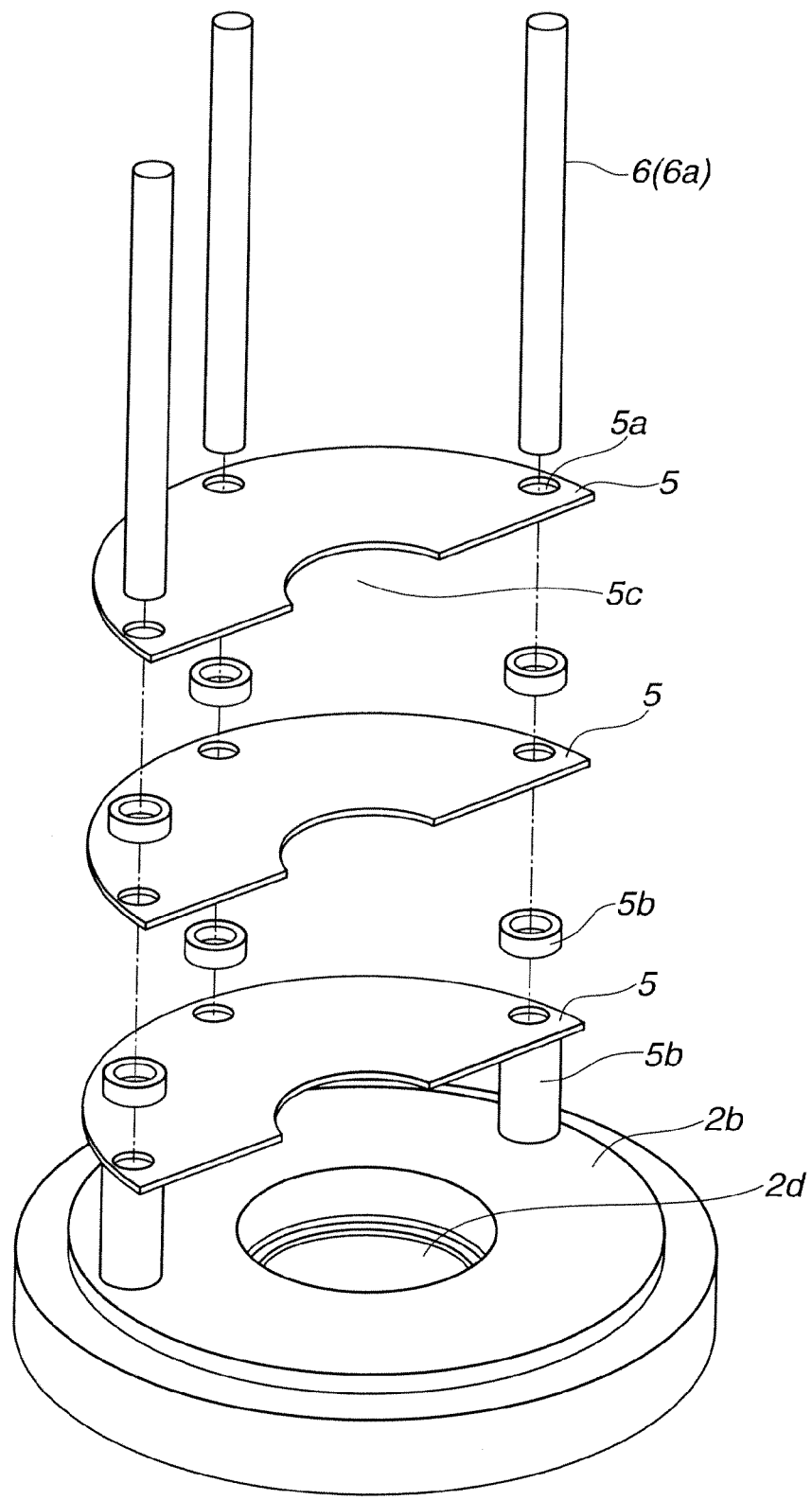
FIG. 2 is a perspective exploded view of a part of a fixed electrode for explaining an example of the fixed electrode arranged in a vacuum chamber, according to the present embodiment.

FIG. 2 is a perspective exploded view of a part of the fixed electrode 4 for explaining an example of the fixed electrode 4 arranged in the vacuum chamber 1b. As shown in FIG. 2, each electrode member 5 of the fixed electrode 4 is provided with a fixing hole 5a (three fixing holes in FIG. 2) to fix the fixed electrode shaft 6 by penetration of the fixed electrode shaft 6. Then the electrode members 5 are layered so that the fixed electrode shaft 6 penetrates each fixing hole 5a. In order to make a space between the electrode members 5, for instance, as shown in FIG. 2, the ring-shaped spacer 5b having a predetermined thickness (that is thicker than the electrode member 8 of the movable electrode 7) which the fixed electrode shaft 6 can penetrate is provided in each space between the electrode members 5, thereby making a gap (i.e. a gap having the same thickness as the spacer 5b) between the electrode members 5.

Here, it is required that each electrode member 5 does not interfere with the movable electrode shaft 9 and an after mentioned spacer 8b, etc. when arranged in layers as described above. A cutting portion 5c etc. is then formed, as appropriate, as shown in FIG. 2. Further, it is required that the fixed electrode shaft 6 does not interfere with the movable electrode 7 inserted into and extracted from the fixed electrode 4. For instance, it is preferable that the fixed electrode shaft stand and be provided at a position close to an inner circumferential wall surface of the vacuum chamber 1b.

Figure 3:
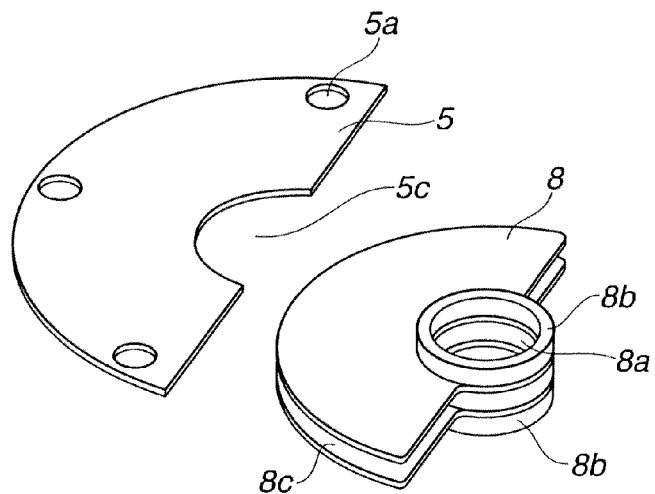
FIG. 3 is a schematic view for explaining an example of a movable electrode arranged in the vacuum chamber, according to the present embodiment.

FIG. 3 is a schematic view for explaining an example of the movable electrode 7 arranged in the vacuum chamber 1b. As shown in FIG. 3, each electrode member 8 of the movable electrode 7 is also provided with a fixing hole 8a to fix the movable electrode shaft 9 by penetration of the movable electrode shaft 9. Then the electrode members 8 are layered so that the movable electrode shaft 9 penetrates each fixing hole 8a. In order to make a space between the electrode members 8, for instance, as shown in FIG. 3, the ring-shaped spacer 8b having a predetermined thickness (that is thicker than the electrode member 5 of the fixed electrode 4) which the movable electrode shaft 9 can penetrate is provided in each space between the electrode members 8, thereby making a gap (i.e. a gap 8c having the same thickness as the spacer 8b) between the electrode members 8. In addition, also in a case where configuration, in which the portion 11e touching the movable electrode shaft 9 is not formed into the pointed shape but formed into a flat shape and the end surface of the movable electrode shaft 9 is formed into a pointed shape then the end surface touches the portion 11e at this apex, is employed, the same effect can be gained.

Here, it is required that each electrode member 8 does not interfere with the fixed electrode shaft 6 and the spacer 5b, etc. when inserted into and extracted from the fixed electrode 4 by rotation. For example, as shown in FIG. 3, the electrode member 8 having a smaller area than that of the electrode member 5 is used.

Figure 4:
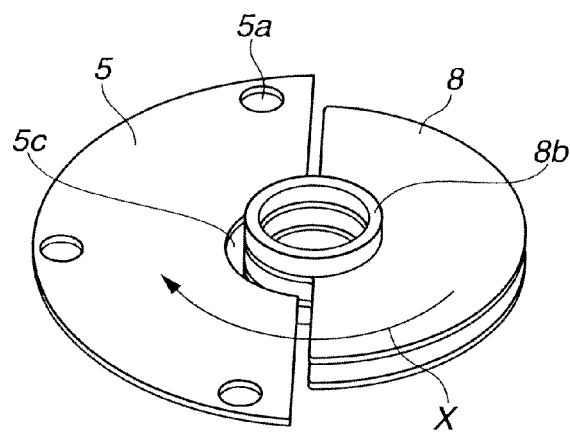
FIG. 4 is a schematic view for explaining an example of change of capacitance by insertion/extraction of the fixed electrode and the movable electrode, according to the present embodiment.
Figure 5:
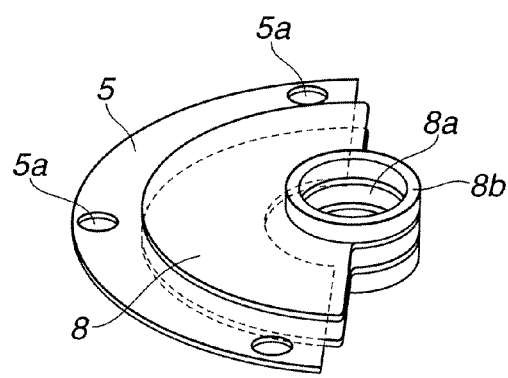
FIG. 5 is a schematic view for explaining an example of change of the capacitance by the insertion/extraction of the fixed electrode and the movable electrode, according to the present embodiment.

FIGS. 4 and 5 are schematic views for explaining examples of change of capacitance by insertion/extraction of the fixed electrode 4 and the movable electrode 7. As shown in FIG. 4, when the fixed electrode 4 (each electrode member 5) and the movable electrode 7 (each electrode member 8) do not overlap each other, the capacitance of the vacuum capacitor is a minimum capacitance value. When the movable electrode 7 rotates in an X direction in FIG. 4 and overlaps the fixed electrode 4, as the overlap area becomes larger, the capacitance value increases. As shown in FIG. 5, when the overlap area is in a maximum state, the capacitance of the vacuum capacitor is a maximum capacitance value.

Each of the electrode member 5 and the electrode member 8 shown in FIGS. 1~5 is the flat electrode member, and each area of both end surfaces of the respective electrode members is smaller than an area in a cross-section direction of the inside of the vacuum chamber 1b. For example, it is a semicircular disk, a sector-shaped disk and a triangular-shaped disk. That is, as long as the overlap area between the electrode members 5 and 8 can change according to the rotation of the movable electrode 7 and the electrode member 8 can rotate inside the vacuum chamber 1b, various shapes of electrode members can be employed for the electrode members 5 and 8.

Although each of the electrode members 5 and 8 in the drawings is the semicircular disk, namely that its shape is about half of 360°, by the rotation of the movable electrode 7 which is within one revolution, it is possible that the capacitance of the vacuum capacitor instantaneously varies within a range from the minimum capacitance value to the maximum capacitance value.

Here, in a case where each size of shape of the electrode members 5 and 8 is over the half of 360°, for instance, it might be difficult to install the movable electrode 7 after arranging the fixed electrode 4 in the vacuum chamber 1b (namely that the movable electrode 7 and the fixed electrode 4 might interfere with each other upon the installation). For this reason, in the case of the semicircular disk like the electrode members 5 and 8 shown in the drawings, namely, in the case of the size of shape that is approximately half of 360° or less, it can be said there is an advantage in assembly.

Figure 6:
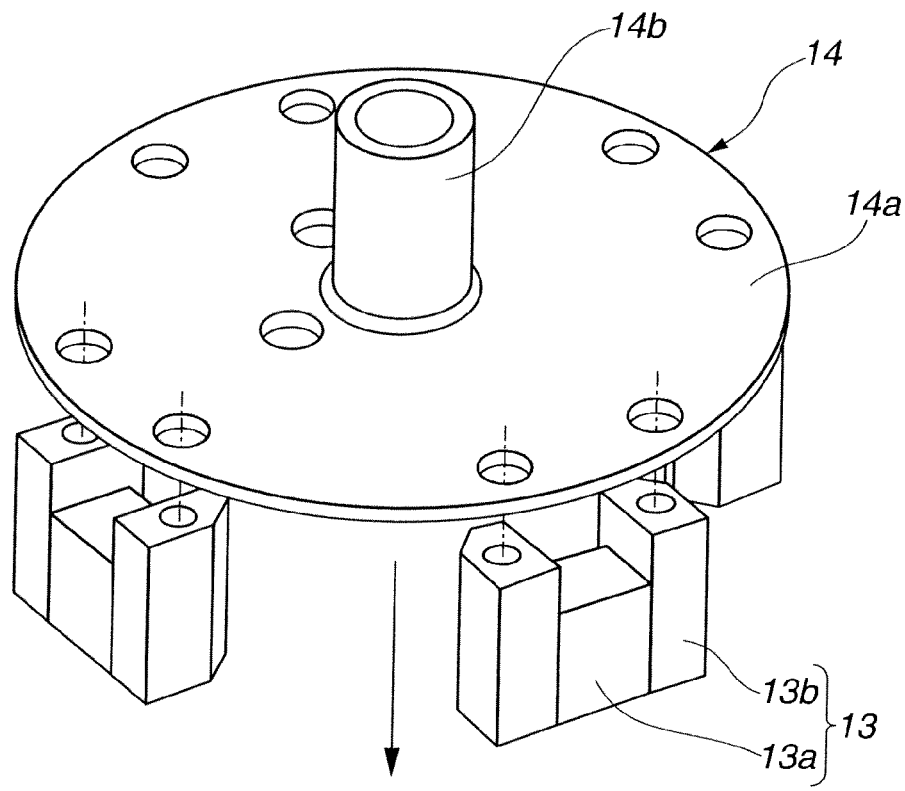
FIG. 6 is a schematic view for explaining an example of a supporting structure of a capacitance control unit, according to the present embodiment.
Figure 6:
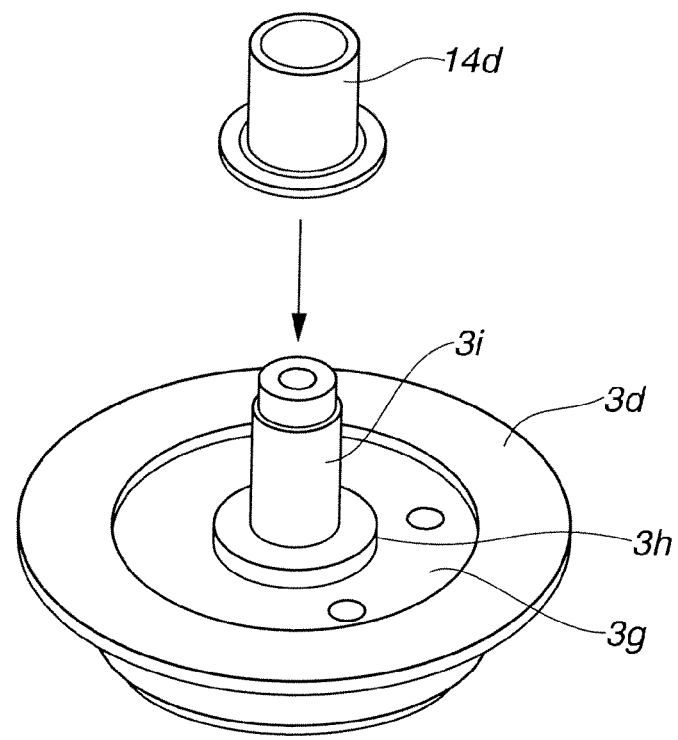

FIG. 6 is a schematic view for explaining an example of a supporting structure of the capacitance control unit 14. In FIG. 6, a ring-shaped holding groove 3g is formed on a surface of the cover member 3d outside the vacuum chamber 1b. Further, a cover member side guide shaft 3i is formed so as to protrude from part of a seat 3h that is encircled with the holding groove 3g. Then the control member side guide shaft 14b is fitted onto the cover member side guide shaft 3i (the cover member side guide shaft 3i is inserted into the control member side guide shaft 14b) and is rotatably supported, through a bearing (an oilless bearing etc.) 14d.

Here, as shown in FIG. 1, in order to prevent the bearing 14d from coming out, for instance, a flange 14e is formed in the control member side guide shaft 14b. In addition, in order to prevent the coming out of the capacitance control unit 14 that is fitted onto the cover member side guide shaft 3i as described above, a screw 14f etc. is provided at a top portion of the cover member side guide shaft 3i.

Figure 7:
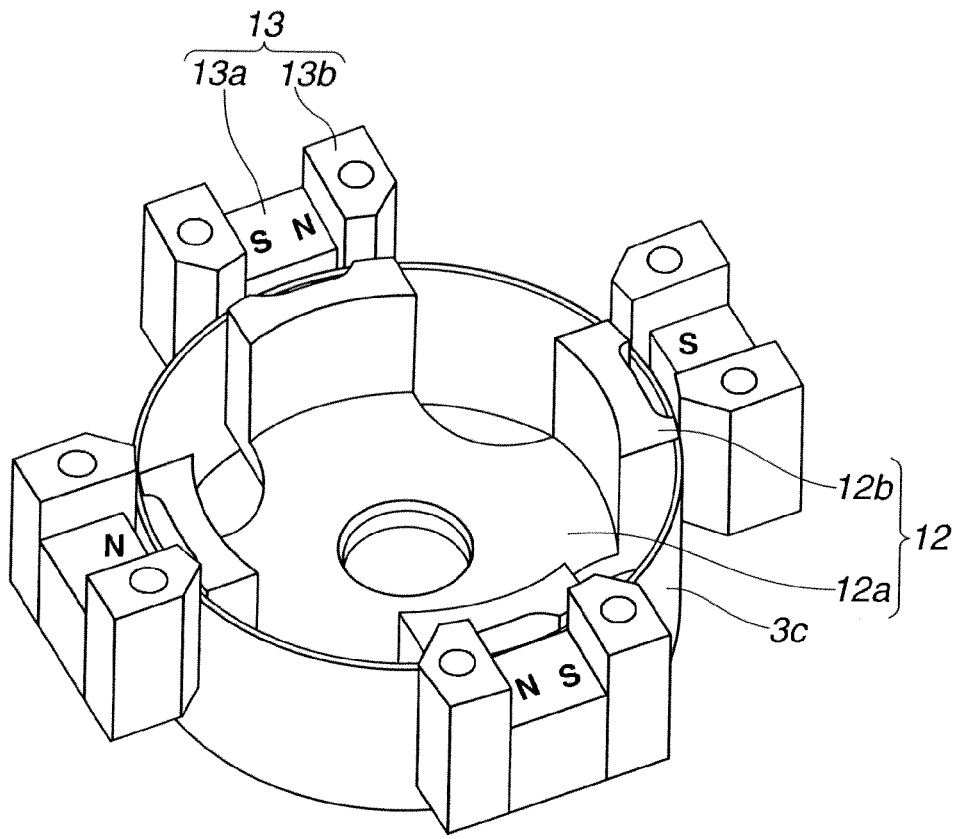
FIG. 7 is a schematic view for explaining an example of a structure in which magnetic flux $\Phi$ of a magnetic flux generating unit is received by a magnetic flux receiving unit, according to the present embodiment.
Figure 8:
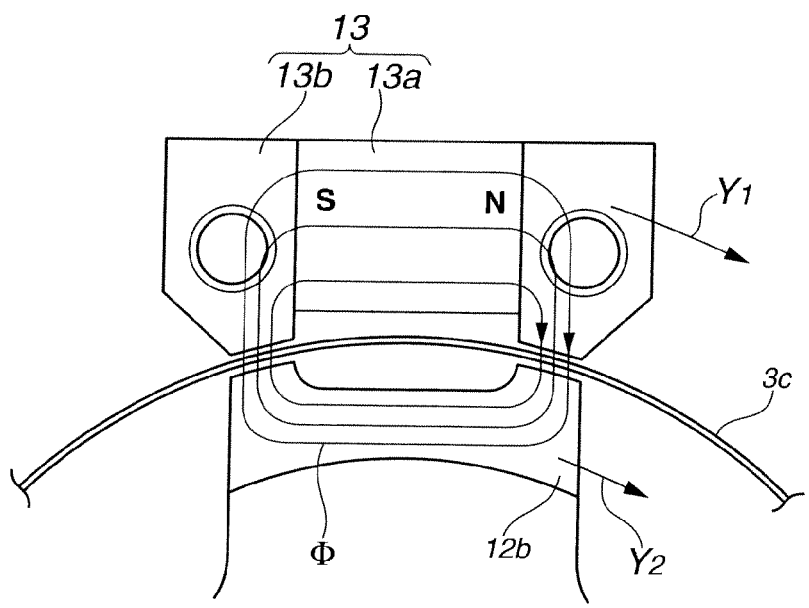
FIG. 8 is a schematic view for explaining the example of the structure in which the magnetic flux $\Phi$ of the magnetic flux generating unit is received by the magnetic flux receiving unit, according to the present embodiment.

FIGS. 7 and 8 are schematic views for explaining examples of a structure in which the magnetic flux Φ of the magnetic flux generating unit 13 is received by the magnetic flux receiving unit 12. In FIG. 7, the magnetic flux receiving unit 12 is formed by arranging the four receiving walls 12b at regular intervals at the disk member 12a. The capacitance control unit 14 is formed by arranging the four magnetic flux generating units 13 at regular intervals at the outer circumferential edge portion of the disk member 14a.

In a case where each receiving wall 12b and each magnetic flux generating unit 13 are arranged so as to face each other through the partition wall 3c of the seal member 3, as shown in FIG. 8, by the magnetic flux Φ generated from the magnetic flux generating unit 13, magnetic circuit is formed between the receiving wall 12b and the magnetic flux generating unit 13, and magnetic attraction is generated. In a case where the capacitance control unit 14 is rotated (for instance, in a Y1 direction in FIG. 8) in a state in which the magnetic attraction is generated as described above, a rotation torque is generated at the magnetic flux receiving unit 12 in response to the rotation of the capacitance control unit 14. In a case where the magnetic flux receiving unit 12 is rotated (for instance, in a Y2 direction in FIG. 8) by the rotation torque generated according to the magnetic attraction as explained above, when the rotation torque by the magnetic attraction exceeds the rotation resistance of the movable electrode shaft 9 etc., the magnetic flux receiving unit 12 rotates. Therefore, when appropriately selecting a drive source and the permanent magnet 13a of the magnetic flux generating unit 13, etc. to control the capacitance control unit 14 with consideration given to the rotation resistance etc. of the movable electrode shaft 9, the magnetic flux receiving unit 12 rotates.

Here, the magnetic flux generating unit 13 in FIG. 8 is located in a radial direction of the magnetic flux receiving unit 12 (the receiving wall 12b), namely that the magnetic flux receiving unit 12 and the magnetic flux generating unit 13 are arranged in a same line direction orthogonal to the movable electrode shaft 9, and therefore the magnetic attraction acts on the magnetic flux receiving unit 12 in the direction orthogonal to an axial direction of the magnetic flux receiving unit 12 (the movable electrode shaft 9). Further, when employing the arrangement of a plurality of the magnetic flux generating units 13 as shown in FIG. 8, for example, by arranging these magnetic flux generating units 13 at regular intervals along the circumferential direction, general distribution of the magnetic flux formed by the magnetic flux generating units 13 is symmetric with respect to the axis. That is to say, it is possible to generate the magnetic flux without an occurrence of unevenness in the magnetic flux distribution.

According to the vacuum capacitor of the present invention as described above, when rotating the capacitance control unit (by the drive source such as a motor), the magnetic flux generating unit rotates around an outer circumference of the vacuum casing, and the magnetic flux receiving unit in the vacuum casing rotates by the magnetic attraction of the magnetic flux generating unit in synchronization with the rotation of the magnetic flux generating unit. That is, since the magnetic flux receiving unit is fixed to the movable electrode shaft, the movable electrode secured to the movable electrode shaft rotates in synchronization with the magnetic flux receiving unit. Hence, the vacuum capacitor of the present invention does not require any bellows etc. that is used in the related art vacuum capacitor and expand and contract in the axial direction of the vacuum casing. With this, the life of the vacuum casing (the vacuum chamber etc.) can be prevented from being shortened.

Further, in the case where the melting fixation is performed by brazing in the vacuum condition when producing the vacuum at high temperature for each structure arranged in the vacuum casing, for instance, it is preferable that the ferromagnetic material be used for the magnetic flux receiving unit. The magnetic flux generating unit can be arranged outside of the vacuum casing after performing the melting fixation of each structure in the vacuum casing by brazing in the vacuum condition. That is, for example, in a case where the magnetic flux generating unit is exposed to a high temperature atmosphere during the assembly of the vacuum capacitor, it is required to provide the magnetic flux generating unit with consideration given to demagnetization due to the high temperature (for instance, it is required to use a large-sized magnet). However, like the magnetic flux generating unit of the present invention, since it is possible to avoid the exposure to the high temperature atmosphere during the high temperature vacuum production process (to avoid the demagnetization due to the high temperature) and to make full use of the capability which the magnetic flux generating unit essentially has, the vacuum capacitor can be prevented from being large in size (or reduction in size of the vacuum capacitor can be possible).

In FIG. 1, the fixed electrode is divided into the one side fixed electrode and the other side fixed electrode, and their lead connection terminals are positioned at the one side seal member side rather than the other side seal member side, namely that their lead connection terminals are positioned apart from the magnetic flux generating unit. Consequently, even if heat and the magnetic flux due to application of current are generated upon the current application to the fixed electrode, it is possible that the magnetic flux generating unit is unaffected by the heat and the magnetic flux. Further, a plurality of the fixed electrode shafts are used. That is, since the individual fixed electrode shaft is provided for each of the one side fixed electrode and the other side fixed electrode, an expansion/contraction phenomenon of the fixed electrode shaft caused by the heat can be suppressed. In this case, for instance, change of a gap between the movable electrode and the fixed electrode can be suppressed, a stable capacitance value can therefore be obtained.

Here, in the case where the fixed electrode is divided into a plurality of the fixed electrodes (for instance, divided in a direction of the layer arrangement of the electrode members), it is preferable that each divided fixed electrode be lead to the outside of the vacuum casing through the lead connection terminal and the magnetic flux generating unit be unaffected by the heat and the magnetic flux, even if the heat and the magnetic flux due to application of current are generated upon the current application to the fixed electrode.

Furthermore, in the case where the both end portions of the movable electrode shaft are formed from the insulator and the movable electrode is electrically insulated from the outside of the vacuum casing and for instance the insulative shafts are provided at both end sides of the movable electrode shaft, a structure of a movable part (the movable electrode, the movable electrode shaft) is in a state in which the metal and the insulator touch each other. Thus there is no metal-metal contact, and an agglutination phenomenon (junction between the metals in the vacuum condition) can be avoided. In a case where the insulative shaft has heat resistance in comparison with the other metal members etc., for instance, even if the movable part is exposed to the high temperature atmosphere during the assembly of the vacuum capacitor, an expansion/contraction phenomenon of the movable electrode shaft caused by the heat can be suppressed. In this case, for instance, change of the gap between the movable electrode and the fixed electrode can be further suppressed, and the more stable capacitance value can be obtained.

Moreover, also in the case where the movable electrode shaft is rotatably supported using the adjustment diaphragm, since the movable electrode shaft is forced in the direction of the seal member which is opposite to the adjustment diaphragm, for instance, change of the gap between the movable electrode and the fixed electrode can be suppressed, and the more stable capacitance value can be obtained. Additionally, by forming the portion of the adjustment diaphragm which touches the movable electrode shaft into a small shape (by forming the pointed shaped portion or an acute shaped portion), the rotation resistance of the movable electrode shaft can be reduced. This can allow a decrease in driving force of the vacuum capacitor, e.g. a decrease in consumption of drive energy to rotate the capacitance control unit, and also a reduction in size of the vacuum capacitor.

Although only the embodiment described above in the present invention has been explained in detail, it is obvious to a person skilled in the art that modifications and variations of the embodiment can be possible within a scope of technical idea of the present invention. It is right that these modifications and variations are included in the scope of the claims.

EXPLANATION OF REFERENCE

1 . . . vacuum capacitor
1a . . . vacuum casing
1b . . . vacuum chamber
2, 3 . . . seal member
4 . . . fixed electrode
5, 8 . . . electrode member
6 . . . fixed electrode shaft
7 . . . movable electrode
9 . . . movable electrode shaft
11a . . . adjustment diaphragm
12 . . . magnetic flux receiving unit
13 . . . magnetic flux generating unit
14 . . . capacitance control unit

The invention claimed is:

1. A vacuum capacitor comprising:
a fixed electrode that is formed from a plurality of electrode members in a vacuum casing, the fixed electrode being divided into a plurality of fixed electrodes and each fixed electrode being lead to an outside of the vacuum casing and electrically connected to each other in series through respective lead connection terminals,
a movable electrode that is formed from a plurality of electrode members arranged in gaps formed between the electrode members of the fixed electrode in the vacuum casing;
a movable electrode shaft that supports the movable electrode, capacitance appearing between the movable electrode and the fixed electrode being varied by rotation of the movable electrode shaft;
a magnetic flux receiving unit that rotates the movable electrode shaft in the vacuum casing;
a magnetic flux generating unit that is located outside the vacuum casing and rotates the magnetic flux receiving unit by magnetic attraction; and
a capacitance control unit that rotates the magnetic flux generating unit.

2. The vacuum capacitor as claimed in claim 1, wherein:
by positioning the lead connection terminals apart from the magnetic flux generating unit, interference of generated heat and magnetic flux with the magnetic flux generating unit upon current application to the lead connection terminals is reduced.

3. The vacuum capacitor as claimed in claim 2, wherein:
the fixed electrode divided into a plurality of fixed electrodes is supported by respective fixed electrode shafts.

4. The vacuum capacitor as claimed in claim 1, wherein:
the magnetic flux receiving unit and the magnetic flux generating unit are arranged in a same line direction orthogonal to the movable electrode shaft.

5. The vacuum capacitor as claimed in claim 1, wherein:
the capacitance control unit has a plurality of magnetic flux generating units, and
the magnetic flux generating units are arranged at regular intervals along a circumferential direction.

6. The vacuum capacitor as claimed in claim 1 wherein:
each area of the electrode members is smaller than an area in a cross-section direction of an inside of the vacuum casing, and
by the rotation of the movable electrode shaft which is within one revolution, the capacitance is variable within a range from a minimum capacitance value to a maximum capacitance value.

7. The vacuum capacitor as claimed in claim 1, further comprising:
a forcing part that is provided at a portion of an inner wall of the vacuum casing which faces one end portion of the movable electrode shaft, and is a partition that covers and seals a penetration hole formed at the portion from the inside of the vacuum casing, and supports the one end portion of the movable electrode shaft while forcing the movable electrode shaft in a direction of the other end portion of the movable electrode shaft.

8. The vacuum capacitor as claimed in claim 1, further comprising:
a supporting portion that is provided at either one side of the movable electrode shaft and a vacuum casing inner wall facing the movable electrode shaft and supports the other side at one point.

9. A vacuum capacitor comprising:
a vacuum casing formed by closing both opening end sides of an insulation tube body by respective seal members;
a fixed electrode formed by arranging a plurality of flat electrode members in layers at a certain distance in an axial direction of the vacuum casing in the vacuum casing;
a movable electrode formed by arranging a plurality of flat electrode members in layers at a certain distance in the axial direction of the vacuum casing in the vacuum casing, and fixed to a movable electrode shaft that extends in the axial direction of the vacuum casing and is rotatably supported in the vacuum casing, and by rotation of the movable electrode shaft, each electrode member of the movable electrode being inserted into and extracted from a gap between the electrode members of the fixed electrode and alternately overlapping the electrode member of the fixed electrode with each electrode member of the movable electrode in noncontact with the electrode members of the fixed electrode;
a magnetic flux receiving unit fixed to the movable electrode shaft in the vacuum casing and receiving magnetic flux from the outside of the vacuum casing through a seal member; and
a capacitance control unit having a magnetic flux generating unit that generates the magnetic flux and rotatably supported outside a seal member, and
the fixed electrode being divided into a plurality of fixed electrodes and each fixed electrode being lead to an outside of the vacuum casing and electrically connected to each other in series through respective lead connection terminals, and
by rotating the capacitance control unit also rotating the magnetic flux receiving unit by magnetic attraction of the magnetic flux, an overlap area of the movable electrode with respect to the fixed electrode being changed, and capacitance being adjustable.

10. The vacuum capacitor as claimed in claim 9, wherein:
the fixed electrode is divided into a plurality of fixed electrodes in a direction of the layer arrangement of the electrode members and each fixed electrode is lead to an outside of the vacuum casing from a gap between the fixed electrodes and electrically connected to each other through respective lead connection terminals, and
by positioning the lead connection terminals apart from the magnetic flux generating unit, interference of generated heat and magnetic flux with the magnetic flux generating unit upon current application to the lead connection terminals is reduced.

11. The vacuum capacitor as claimed in claim 10, wherein:
the insulation tube body is divided into a plurality of insulation tube bodies, and at least one of the respective lead connection terminals is disposed between the divided insulation tube bodies.

12. The vacuum capacitor as claimed in claim 10, wherein:
the fixed electrode divided into a plurality of fixed electrodes is supported by respective fixed electrode shafts.

13. The vacuum capacitor as claimed in claim 9, wherein:
the magnetic flux receiving unit and the magnetic flux generating unit are arranged in a same line direction orthogonal to the movable electrode shaft.

14. The vacuum capacitor as claimed in claim 9, wherein:
the capacitance control unit has a plurality of magnetic flux generating units, and
the magnetic flux generating units are arranged at regular intervals along a circumferential direction.

15. The vacuum capacitor as claimed in claim 9, wherein:
each area of the electrode members is smaller than an area in a cross-section direction of an inside of the vacuum casing, and
by the rotation of the movable electrode shaft which is within one revolution, the capacitance is variable within a range from a minimum capacitance value to a maximum capacitance value.

16. The vacuum capacitor as claimed in claim 9, further comprising:
a forcing part that is provided at a portion of an inner wall of the vacuum casing which faces one end portion of the movable electrode shaft, and is a partition that covers and seals a penetration hole formed at the portion from the inside of the vacuum casing, and supports the one end portion of the movable electrode shaft while forcing the movable electrode shaft in a direction of the other end portion of the movable electrode shaft.

17. The vacuum capacitor as claimed in claim 9, further comprising:
a supporting portion that is provided at either one side of the movable electrode shaft and a vacuum casing inner wall facing the movable electrode shaft and supports the other side at one point.

* * * * *